(12) United States Patent
Andrews et al.

(10) Patent No.: US 11,453,448 B1
(45) Date of Patent: Sep. 27, 2022

(54) COLLAPSIBLE UTILITY TRAILER

(71) Applicant: AAA Manufacturing Inc., Shelley, ID (US)

(72) Inventors: Charles Kevin Andrews, Shelley, ID (US); Elden Ray Croft, Idaho Falls, ID (US)

(73) Assignee: AAA Manufacturing Inc., Shelley, ID (US)

( * ) Notice: Subject to any disclaimer, the term of this patent is extended or adjusted under 35 U.S.C. 154(b) by 0 days.

(21) Appl. No.: 17/832,902

(22) Filed: Jun. 6, 2022

Related U.S. Application Data

(60) Provisional application No. 63/361,097, filed on Nov. 24, 2021.

(51) Int. Cl.
| | |
|---|---|
| *B62D 63/06* | (2006.01) |
| *B60D 1/52* | (2006.01) |
| *F16B 2/06* | (2006.01) |
| *B62D 63/08* | (2006.01) |
| *B60P 3/41* | (2006.01) |

(52) U.S. Cl.
CPC ............ *B62D 63/061* (2013.01); *B60D 1/52* (2013.01); *B62D 63/064* (2013.01); *B62D 63/08* (2013.01); *F16B 2/06* (2013.01)

(58) Field of Classification Search
CPC ... B61D 3/08; B61D 5/06; B60D 1/44; B60D 1/52; B60D 1/54; B60D 2001/544; B62D 63/061; B62D 63/062; B62D 63/064; B62D 63/08; F16B 2/06; B60P 3/22; B60P 3/105; B60P 3/41; B60P 3/2215; B60P 7/13

USPC ............ 280/39, 40, 42, 656, 404, 79.7, 145, 280/414.1; 296/181.7
See application file for complete search history.

(56) References Cited

U.S. PATENT DOCUMENTS

| | | | | |
|---|---|---|---|---|
| 910,372 | A | * | 1/1909 | Gundelach |
| 2,456,013 | A | * | 12/1948 | Nelson ................. B62D 63/061 296/181.7 |
| 2,495,898 | A | * | 1/1950 | King ..................... B60P 1/6454 280/145 |
| 2,636,745 | A | * | 4/1953 | Cartwright ............ B60P 3/1033 280/124.179 |
| 4,168,093 | A | * | 9/1979 | Dysthe ................. B62D 63/064 296/10 |
| 4,230,340 | A | * | 10/1980 | Wasservogel .......... B60G 11/14 280/43.17 |
| 4,671,530 | A | * | 6/1987 | van der Wouden . B62D 63/061 280/652 |

(Continued)

*Primary Examiner* — Anne Marie M Boehler
(74) *Attorney, Agent, or Firm* — Parsons Behle & Latimer

(57) ABSTRACT

A collapsible trailer that includes a longitudinal beam, a first transverse beam, a second transverse, and a third transverse beam. A first vertical arm is pivotally connected to a first end of the first transverse beam and a second vertical arm is pivotally connected to a second end of the first transverse beam. A third vertical arm is pivotally connected to a first end of the second transverse beam and a fourth vertical arm is pivotally connected to a second end of the second transverse beam. A fifth vertical arm is pivotally connected to a first end of the third transverse beam and a sixth vertical arm is pivotally connected to a second end of the third transverse beam. A first wheel is connected to the fifth vertical arm and a second wheel connected to the sixth vertical arm.

21 Claims, 10 Drawing Sheets

(56) References Cited

U.S. PATENT DOCUMENTS

| | | | | |
|---|---|---|---|---|
| 5,823,559 | A | * | 10/1998 | Priesgen ............... B60P 3/1033 280/414.1 |
| 6,378,893 | B1 | * | 4/2002 | Jager .................... B62D 33/033 280/401 |
| 7,021,461 | B1 | * | 4/2006 | Robey .................... B65D 85/68 211/5 |
| 7,073,816 | B1 | * | 7/2006 | Larson ................. B62D 63/062 280/789 |
| 8,590,962 | B2 | * | 11/2013 | Nye ..................... B62D 33/027 296/183.1 |
| 9,573,639 | B1 | * | 2/2017 | Furtado ................ B62D 63/061 |
| 9,932,078 | B1 | * | 4/2018 | Nehring ................. B60P 1/003 |
| D869,993 | S | * | 12/2019 | Sagen .......................... D12/101 |
| 2007/0262562 | A1 | * | 11/2007 | Senatore ............. B62D 63/061 280/491.1 |
| 2009/0212515 | A1 | * | 8/2009 | Oyasaeter ............ B62D 63/062 280/40 |
| 2012/0292890 | A1 | * | 11/2012 | Lomas ................. B62D 63/061 280/656 |
| 2014/0210182 | A1 | * | 7/2014 | Knight .................. B60D 1/665 280/404 |
| 2014/0265248 | A1 | * | 9/2014 | Ravencroft .......... B62D 63/061 280/491.1 |

\* cited by examiner

COLLAPSIBLE UTILITY TRAILER

RELATED APPLICATION

This application claims the benefit of priority under 35 U.S.C. § 119 to U.S. Provisional Patent Application Ser. No. 63/361,097 entitled "Mini Logger/Fecal Ferry" filed on Nov. 24, 2021, which is incorporated herein in its entirety.

FIELD OF THE DISCLOSURE

This disclosure is generally related to a collapsible utility trailer.

BACKGROUND

One concern when camping is the gathering and transporting of firewood to a campsite. Once a firewood source or sources are located, many trips may often be needed between the source and a campsite due to the limited carrying capacity of individuals. When camping in a recreational vehicle (RV), it may be necessary to empty the gray and/or black water tanks of the RV. It may be necessary to move the RV from the campsite to a dumping station, which may be inconvenient. It would be beneficial to be able to dump the tanks without needing to move the RV from a campsite. Other disadvantages may exist concerning the movement of materials to and from a campsite.

SUMMARY

The disclosure is generally related to a collapsible utility trailer that may be used to move material to and from a campsite.

An embodiment of the disclosure is a trailer. The trailer includes a longitudinal beam having a first end and a second end opposite of the first end, a top surface and a bottom surface opposite of the top surface, a left surface, and a right surface opposite of the left surface. The trailer includes a first transverse beam having a first end, a second end, a top surface, a bottom surface, a left side, and a right side, the first transverse beam is located at the second end of the longitudinal beam, the first transverse beam is connected to the longitudinal beam and is positioned transverse to the longitudinal beam. The trailer includes a first vertical arm pivotally connected to the first end of the first transverse beam, wherein the first vertical arm is movable between an extended position in which the first vertical arm is perpendicular to the first transverse beam and a collapsed position in which the first vertical arm is parallel to the first transverse beam and wherein in the extended position the first vertical arm extends away from the top surface of the first transverse beam. The trailer includes a second vertical arm pivotally connected to the second end of the first transverse beam, wherein the second vertical arm is movable between an extended position in which the second vertical arm is perpendicular to the first transverse beam and a collapsed position in which the second vertical arm is parallel to the first transverse beam and wherein in the extended position the second vertical arm extends away from the top surface of the first transverse beam.

The trailer includes a second transverse beam having a first end, a second end, a top surface, a bottom surface, a left side, and a right side, the second transverse beam is connected to the longitudinal beam and is positioned transverse to the longitudinal beam. The trailer includes a third vertical arm pivotally connected to the first end of the second transverse beam, wherein the third vertical arm is movable between an extended position in which the third vertical arm is perpendicular to the second transverse beam and a collapsed position in which the third vertical arm is parallel to the second transverse beam and wherein in the extended position the third vertical arm extends away from the top surface of the second transverse beam. The trailer includes a fourth vertical arm pivotally connected to the second end of the second transverse beam, wherein the fourth vertical arm is movable between an extended position in which the fourth vertical arm is perpendicular to the second transverse beam and a collapsed position in which the fourth vertical arm is parallel to the second transverse beam and wherein in the extended position the fourth vertical arm extends away from the top surface of the second transverse beam.

The trailer includes a third transverse beam having a first end and a second end, the third transverse beam is positioned between the first transverse beam and the second transverse beam, the third transverse beam is connected the longitudinal beam and is positioned transverse to the longitudinal beam. The trailer includes a fifth vertical arm pivotally connected to the first end of the third transverse beam, wherein the fifth vertical arm is movable between an extended position in which the fifth vertical arm is perpendicular to the third transverse beam and a collapsed position in which the fifth vertical is parallel to the third transverse beam and wherein in the extended position the third vertical arm extends away from the bottom surface of the third transverse beam. The trailer includes a sixth vertical arm pivotally connected to the second end of the third transverse beam, wherein the sixth vertical arm is movable between an extended position in which the sixth vertical arm is perpendicular to the third transverse beam and a collapsed position in which the sixth vertical arm is parallel to the third transverse beam and wherein in the extended position the sixth vertical arm extends away from the bottom surface of the third transverse beam. The trailer includes a first wheel connected to the fifth vertical arm and a second wheel connected to the sixth vertical arm.

The first transverse beam of the trailer may be connected to the top surface of the longitudinal beam. The second transverse beam of the trailer may be connected to the top surface of the longitudinal beam. The third transverse beam of the trailer may be connected to the bottom surface of the longitudinal beam. The trailer may include a first hinge connected between the first vertical arm and the first transverse beam and a second hinge connected between the second vertical arm and the first transverse beam. The trailer may include a tab connected to the first end of the first transverse beam and a latch connected to the first vertical arm. The latch may be pivotable with respect to the first vertical arm. The trailer may include a hook connected to the latch. The first vertical may be selectively secured in the extended position when the hook engages the tab. The latch may be selectively pivoted to move the hook out of engagement with the tab to enable the first vertical arm to move from the extended position to the collapsed position.

The trailer may include a first inner hole through the left and right sides of the first transverse beam and a first outer hole through the left and right sides of the first transverse beam. The first hinge may be positioned between the first outer hole and the first inner hole. The trailer may include a second inner hole through the left and right sides of the first transverse beam and a second outer hole through the left and right sides of the first transverse beam. The second hinge may be positioned between the second outer hole and the second inner hole.

The trailer may include a first angled plate connected to the first vertical arm. The first angled plate may include a first aperture, wherein the first aperture is aligned with the first inner hole when the first vertical arm is in the extended position and wherein the first aperture is aligned with the first outer hole when the first vertical arm is in the collapsed position. The trailer may include a second angled plate connected to the second vertical arm. The second angled plate may include a second aperture, wherein the second aperture is aligned with the second inner hole when the second vertical arm is in the extended position and wherein the second aperture is aligned with the second outer hole when the second vertical arm is in the collapsed position. The trailer may include a first pin and a second pin. The first pin may lock the first vertical arm in the extended position when inserted through the first aperture and the first inner hole. The first pin may lock the first vertical arm in the collapsed positioned when inserted through the first aperture and the first outer hole. The second pin may lock the second vertical arm in the extended position when inserted through the second aperture and the second inner hole. The second pin may lock the second vertical arm in the collapsed positioned when inserted through the second aperture and the second outer hole.

The trailer may include a first tab and a second tab. The first tab may be located adjacent the left side of the first transverse beam and may extend above the top surface of the first transverse beam. The second tab may be located adjacent the right side of the second transverse beam and may extend above the top surface of the second transverse beam. The trailer may include a container positioned between the first tab and the second tab. The trailer may include a first basket connected to the first end of the first transverse beam and connected to the first end of the second transverse beam. The trailer may include a second basket connected to the second end of the first transverse beam and connected to the second end of the second transverse beam. The container may be positioned between the first basket and the second basket. The trailer may include a first ring attached to the longitudinal beam and a second ring attached to the longitudinal beam. The first ring may be positioned adjacent to the first transverse beam and the second ring may be positioned adjacent to the second transverse beam.

The trailer may include a third hinge connected between the third vertical arm and the second transverse beam. The trailer may include a fourth hinge connected between the fourth vertical arm and the second transverse beam. The trailer may include a third inner hole through the left and right sides of the second transverse beam. The trailer may include a third outer hole through the left and right sides of the second transverse beam, wherein the third hinge is positioned between the third outer hole and the third inner hole. The trailer may include a fourth inner hole through the left and right sides of the second transverse beam and a fourth outer hole through the left and right sides of the second transverse beam, wherein the fourth hinge is positioned between the fourth outer hole and the fourth inner hole. The trailer may include a third angled plate connected to the third vertical arm, the third angled plate including a third aperture, wherein the third aperture is aligned with the third inner hole when the third vertical arm is in the extended position and wherein the third aperture is aligned with the third outer hole when the third vertical arm is in the collapsed position. The trailer may include a fourth angled plate connected to the fourth vertical arm, the fourth angled plate including a fourth aperture, wherein the fourth aperture is aligned with the fourth inner hole when the fourth vertical arm is in the extended position and wherein the fourth aperture is aligned with the fourth outer hole when the fourth vertical arm is in the collapsed position. The trailer may include a third pin, wherein the third pin locks the third vertical arm in the extended position when inserted through the third aperture and the third inner hole and wherein the third pin locks the third vertical arm in the collapsed positioned when inserted through the third aperture and the third outer hole. The trailer may include a fourth pin, wherein the fourth pin locks the fourth vertical arm in the extended position when inserted through the fourth aperture and the fourth inner hole and wherein the fourth pin locks the fourth vertical arm in the collapsed positioned when inserted through the fourth aperture and the fourth outer hole.

The trailer may include a fifth hinge connected between the fifth vertical arm and the third transverse beam. The trailer may include a sixth hinge connected between the sixth vertical arm and the third transverse beam. The trailer may include a fifth hole through the left and right sides of the third transverse beam and a sixth hole through the left and right sides of the third transverse beam. The trailer may include a seventh hole through the top and bottom of the third transverse beam and an eighth hole through the top and bottom of the third transverse beam. The trailer may include a fifth angled plate connected to the fifth vertical arm, the fifth angled plate including a fifth aperture and a sixth angled plate connected to the fifth vertical arm, the sixth angled plate including a sixth aperture. Both the fifth and sixth apertures may be aligned with the fifth hole when the fifth vertical arm is in the extended position. The trailer may include a seventh angled plate connected to the sixth vertical arm, the seventh angled plate including a seventh aperture. The trailer may include an eighth angled plate connected to the sixth vertical arm, the eighth angled plate including an eighth aperture. Both the fifth and sixth apertures may be aligned with the sixth hole when the sixth vertical arm is in the extended position.

The trailer may include a first bolt and a second bolt. The trailer may include a first nut connected to the third transverse beam, an opening of the first nut being aligned with the fifth hole. The trailer may include a second nut connected to the third transverse beam, an opening of the second nut being aligned with the sixth hole. The trailer may include a third nut connected to the fifth vertical arm, an opening of the third nut being aligned with the seventh hole. The trailer may include a fourth nut connected to the sixth vertical arm, an opening of the fourth nut being aligned with the eighth hole. The first bolt may be positioned through the fifth hole, the fifth aperture, the sixth aperture, and the first nut may secure the fifth vertical arm in the extended position. The first bolt may be positioned through the seventh hole and the third nut may secure the fifth vertical arm in the collapsed positioned. The second bolt may be positioned through the sixth hole, the seventh aperture, the eighth aperture, and the second nut may secure the sixth vertical arm in the extended position. The second bolt may be positioned through the eighth hole and the fourth nut may secure the sixth vertical arm in the collapsed position.

The first nut and the second nut may each be welded to the third transverse beam. The third nut may be welded to the fifth vertical arm. The fourth nut may be welded to the sixth vertical arm. The trailer may include a first receiver at the first end of the longitudinal beam and a second receiver at the second end of the longitudinal beam. The trailer may include a hitch connected to the first receiver and a coupler connected to the second receiver. The coupler may include a first portion connected to a second portion, wherein the first and second portions are pivotable with respect to each other between 90 degrees and substantially zero degrees.

One embodiment of the present disclosure is a trailer that includes a longitudinal beam and a first transverse beam connected to the longitudinal beam and positioned transverse to the longitudinal beam. The trailer includes a first vertical arm pivotally connected to a first end of the first transverse beam. The trailer includes a second vertical arm pivotally connected to a second end of the first transverse beam. The trailer incudes a second transverse beam connected to the longitudinal beam and positioned transverse to the longitudinal beam. The trailer includes a third vertical arm pivotally connected to a first end of the second transverse beam. The trailer includes a fourth vertical arm pivotally connected to a second end of the second transverse beam. The trailer includes a third transverse beam connected to the longitudinal beam and positioned transverse to the longitudinal beam. The third transverse beam is positioned between the first transverse beam and the second transverse beam.

The trailer includes a fifth vertical arm pivotally connected to a first end of the third transverse beam. The trailer includes a sixth vertical arm pivotally connected to a second end of the third transverse beam. The trailer includes a first wheel connected to the fifth vertical arm and a second wheel connected to the sixth vertical arm. The trailer includes a coupler connected to an end of the longitudinal beam. The coupler includes a first portion connected to a second portion. The first and second portions are pivotable with respect to each other between 90 degrees and substantially zero degrees. The fifth vertical arm and the sixth vertical arm may both be pivoted between a position perpendicular with the third transverse beam and a positioned parallel with the third transverse beam.

One embodiment of the present disclosure is a trailer including a longitudinal beam and a first transverse beam connected to the longitudinal beam and positioned transverse to the longitudinal beam. The trailer includes a first vertical arm pivotally connected to a first end of the first transverse beam. The trailer includes a second vertical arm pivotally connected to a second end of the first transverse beam. The trailer includes a second transverse beam connected to the longitudinal beam and positioned transverse to the longitudinal beam. The trailer includes a third vertical arm pivotally connected to a first end of the second transverse beam. The trailer includes a fourth vertical arm pivotally connected to a second end of the second transverse beam. The trailer includes a third transverse beam connected to the longitudinal beam and positioned transverse to the longitudinal beam. The third transverse beam is positioned between the first transverse beam and the second transverse beam.

The trailer includes a fifth vertical arm pivotally connected to a first end of the third transverse beam. The trailer includes a sixth vertical arm pivotally connected to a second end of the third transverse beam. The trailer includes a first wheel connected to the fifth vertical arm. The trailer includes a second wheel connected to the sixth vertical arm. The trailer includes a hitch connected to a first end of the longitudinal beam. The hitch includes a ball coupler connected to a tongue, wherein the tongue is configured to telescope within the longitudinal beam. The tongue may have a length that is at least one fourth of a length of the longitudinal beam. The trailer may include a coupler connected to a second end of the longitudinal beam, the coupler comprising a first portion connected to a second portion, wherein the first and second portions are pivotable with respect to each other between 90 degrees and substantially zero degrees.

Figure 1:
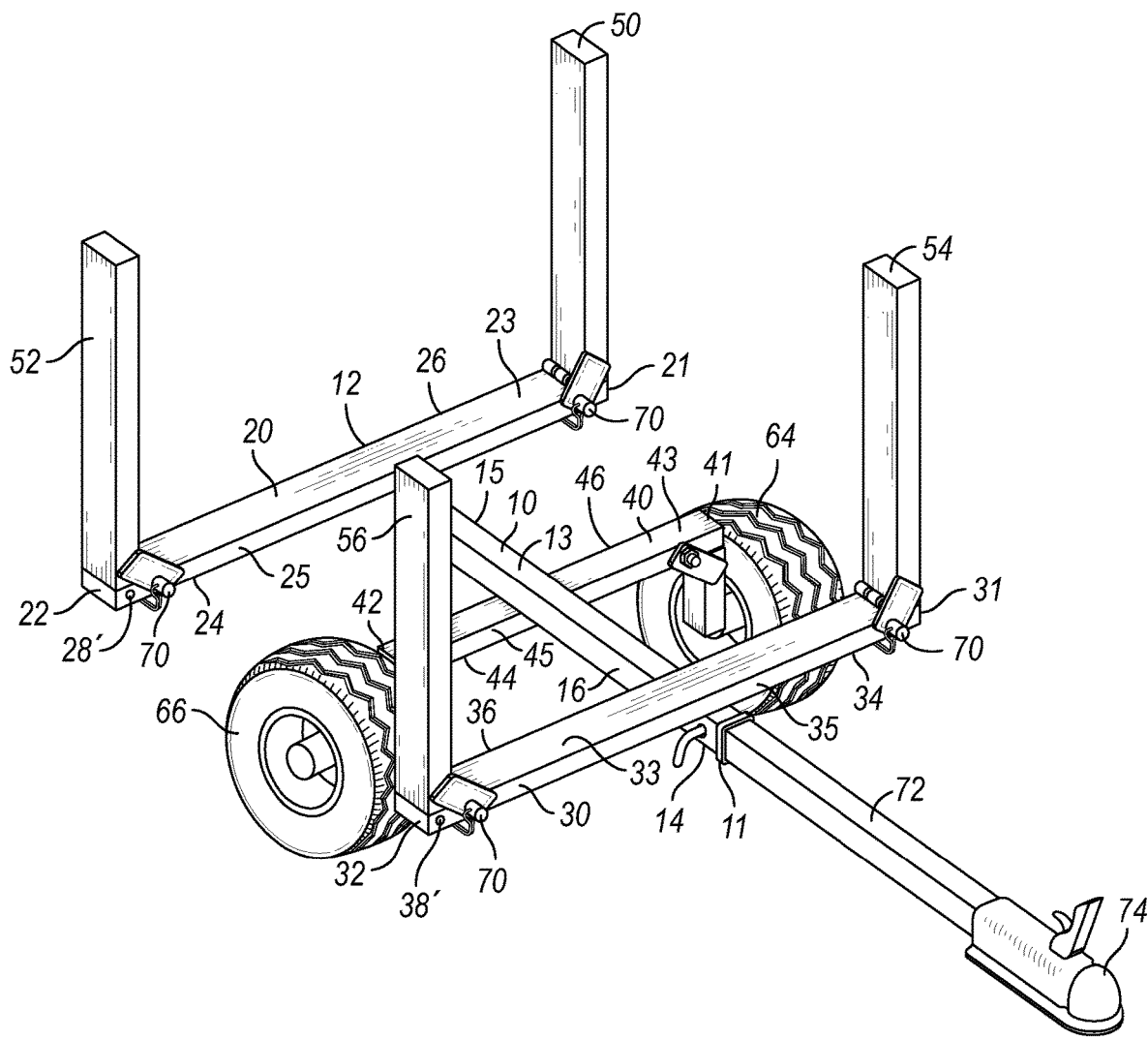
FIG. 1 is a perspective view of an embodiment of a collapsible trailer.

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Figure 2:
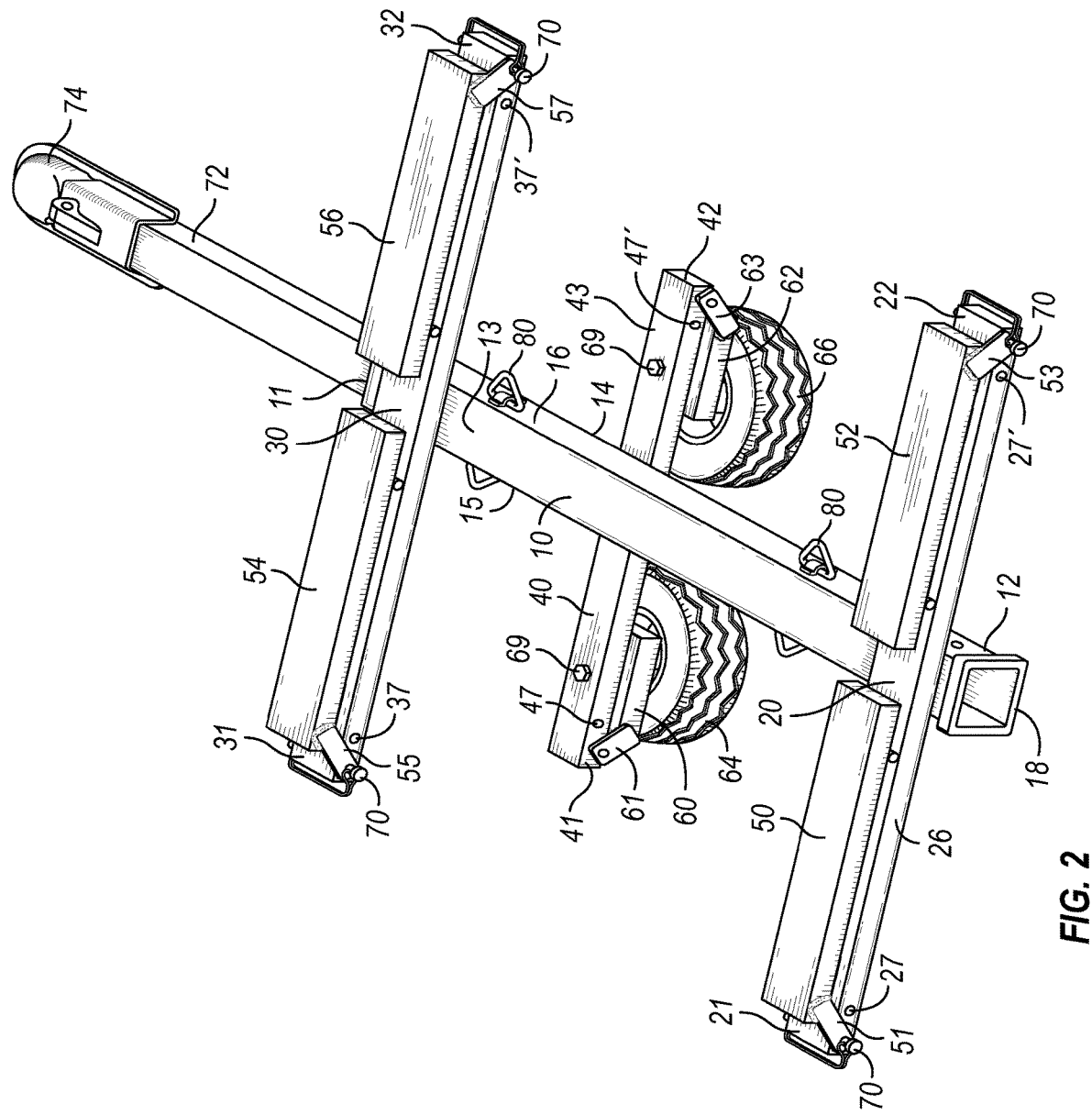
FIG. 2 is a perspective view of an embodiment of a collapsible trailer.

FIGS. 1 and 2 are perspective views of an embodiment of a collapsible trailer 100. The trailer 100 includes a longitudinal beam 10 having a first end 11 and a second end 12 opposite of the first end 10. The longitudinal beam 10 includes a top surface 13 and a bottom surface 14 opposite of the top surface 13 and a left surface 15 and a right surface 16 opposite of the left surface 15. The trailer 100 includes a first transverse 20 beam having a first end 21, a second end 22, a top surface 23, a bottom surface 24, a left side 25, and a right side 26. The first transverse beam 20 is located at the second end 12 of the longitudinal beam 10. The first transverse beam 20 is connected to the longitudinal beam 10 and is positioned transverse to the longitudinal beam 10. The trailer 100 includes a first vertical arm 50 pivotally connected to the first end 21 of the first transverse beam 20. For example, a hinge may connect the first vertical arm 50 to the first transverse beam 20. The first vertical arm 50 is movable between an extended position (shown in FIG. 1) in which the first vertical arm 50 is perpendicular to the first transverse beam 20 and a collapsed position (shown in FIG. 2) in which the first vertical arm 50 is parallel to the first transverse beam 20. In the extended position, the first vertical arm 50 extends away from the top surface 23 of the first transverse beam 20. The trailer 100 includes a second vertical arm 52 pivotally connected to the second end 22 of the first transverse beam 20. The second vertical arm 52 is movable between an extended position (shown in FIG. 1) in which the second vertical arm 52 is perpendicular to the first transverse beam 20 and a collapsed position (shown in FIG. 2) in which the second vertical arm 52 is parallel to the first transverse beam 50. In the extended position, the second vertical arm 52 extends away from the top surface 23 of the first transverse beam 20.

The trailer 100 includes a second transverse beam 30 having a first end 31, a second end 32, a top surface 33, a bottom surface 34, a left side 35, and a right side 36. The second transverse beam 30 is connected to the longitudinal beam 10 and is positioned transverse to the longitudinal beam 10. The trailer 100 includes a third vertical arm 54 pivotally connected to the first end 31 of the second transverse beam 30. The third vertical arm 54 is movable between an extended position (shown in FIG. 1) in which the third vertical arm 54 is perpendicular to the second transverse beam 30 and a collapsed position (shown in FIG. 2) in which the third vertical arm 54 is parallel to the second transverse beam 30. In the extended position, the third vertical arm 54 extends away from the top surface 33 of the second transverse beam 30. The trailer 100 includes a fourth vertical arm 56 pivotally connected to the second end 22 of the second transverse beam 20. The fourth vertical arm 56 is movable between an extended position (shown in FIG. 1) in which the fourth vertical arm 56 is perpendicular to the second transverse beam 30 and a collapsed position in which the fourth vertical arm 56 is parallel to the second transverse beam 30. In the extended position, the fourth vertical arm 56 extends away from the top surface 33 of the second transverse beam 30.

The trailer 100 includes a third transverse beam 40 having a first end 41 and a second end 42. The third transverse beam 40 includes a top surface 43, bottom surface 44, front surface 45, and rear surface 46. The third transverse beam 40 is positioned between the first transverse beam 20 and the second transverse beam 30. The third transverse beam 40 is connected the longitudinal beam 10 and is positioned transverse to the longitudinal beam 40. The trailer 100 includes a fifth vertical arm 60 pivotally connected to the first end 41 of the third transverse beam 40. The fifth vertical arm 60 is movable between an extended position (shown in FIG. 1) in which the fifth vertical arm 60 is perpendicular to the third transverse beam 40 and a collapsed position (shown in FIG. 2) in which the fifth vertical 60 is parallel to the third transverse beam 40. In the extended position, the third vertical arm 60 extends away from the bottom surface 44 of the third transverse beam 40. The trailer 100 includes a sixth vertical arm 62 pivotally connected to the second end 42 of the third transverse beam 40. The sixth vertical arm 62 is movable between an extended position (shown in FIG. 1) in which the sixth vertical arm 62 is perpendicular to the third transverse beam 40 and a collapsed position (shown in FIG. 2) in which the sixth vertical arm 62 is parallel to the third transverse beam 40. In the extended position, the sixth vertical arm 62 extends away from the bottom surface 44 of the third transverse beam 40. The trailer 100 includes a first wheel 64 connected to the fifth vertical arm 60 and a second wheel 66 connected to the sixth vertical arm 62.

The first transverse beam 20 of the trailer 100 is connected to the top surface 13 of the longitudinal beam 10. The second transverse beam 30 of the trailer 100 is connected to the top surface 13 of the longitudinal beam 10. The third transverse beam 40 of the trailer 100 is connected to the bottom surface 14 of the longitudinal beam 10. The trailer 100 includes a first hinge 76 connected between the first vertical arm 50 and the first transverse beam 20 and a second hinge 76 connected between the second vertical arm 52 and the first transverse beam 20. The trailer includes a first inner hole 27 through the left and right sides 25, 26 of the first transverse beam 20 and a first outer hole (not shown) through the left and right sides 25, 26 of the first transverse beam 20. The pin 70 is through the first outer hole in FIG. 2. The first hinge 76 is positioned between the first outer hole and the first inner hole 27. The trailer 100 includes a second inner hole 27' through the left and right sides 25, 26 of the first transverse beam 20 and a second outer hole 28' through the left and right sides 25, 26 of the first transverse beam 20. The second hinge 76 is positioned between the second outer hole 28' and the second inner hole 27'. Similarly, the second transverse beam 30 includes a first outer hole, a first inner hole 37, a second outer hole 38', and a second inner hole 37'.

The trailer 100 includes a first angled plate 51 connected to the first vertical arm 50. The first angled plate 51 includes a first aperture 51'. The first aperture 51' is aligned with the first inner hole 27 when the first vertical arm 50 is in the extended position. The first aperture 51' is aligned with the first outer hole when the first vertical arm 50 is in the collapsed position. The trailer 100 includes a second angled plate 53 connected to the second vertical arm 52. The second angled plate 53 includes a second aperture 53'. The second aperture 53' is aligned with the second inner hole 27' when the second vertical arm 52 is in the extended position and the second aperture 53' is aligned with the second outer hole 28' when the second vertical arm 52 is in the collapsed position. The trailer 200 includes a first pin 70 and a second pin 70. The first pin 70 locks the first vertical arm 50 in the extended position when inserted through the first aperture 51' and the first inner hole 27. The first pin 70 locks the first vertical arm 50 in the collapsed positioned when inserted through the first aperture 51' and the first outer hole. The second pin 70 locks the second vertical arm 52 in the extended position when inserted through the second aperture 53' and the second inner hole 27'. The second pin locks the second vertical arm 52 in the collapsed positioned when inserted through the second aperture 53' and the second outer hole 28'. The operation of the third and fourth vertical arms 54, 56 is identical. Other mechanisms may be used to selectively lock the vertical arms 50, 52, 54, 56 in the extended and collapsed positions as would be appreciated by one of ordinary skill in the art having the benefit of this disclosure. For example, fasteners, such as bolts, may be used as disclosed herein with respect to vertical arms 60, 62. As yet another example, a latch and tab may be used as discussed herein with respect to FIGS. 17 and 18.

The trailer 100 includes a front receiver 17 in the first end 11 of the longitudinal beam 10. A tongue 72 may be inserted into the front receiver 17 as would be appreciated by one of ordinary skill in the art having the benefit of this disclosure. A ball coupler 74 is connected to the end of the tongue 72 to enable the trailer 100 to be connected to a ball connected to a vehicle. The tongue 72 may be configured to telescope within the longitudinal beam 10 as discussed herein. The trailer 100 includes a rear receiver 18 in the second end 12 of the longitudinal beam 10. The rear receiver 18 is configured to receive a tongue or coupler as would be appreciated by one of ordinary skill in the art having the benefit of this disclosure.

The first vertical arm 50, second vertical arm 52, third vertical arm 54, and fourth vertical arm 56 are configured to have an extended position (shown in FIG. 1) and a collapsed position (shown in FIG. 2). A pin 70 may be used to selectively secure the vertical arms 50, 52, 54, 56 in each of the positions. Alternatively, a bolt or other fastener may be used to selectively secure the vertical arms 50, 52, 54, 56 in each of the positions as would be appreciated by one of ordinary skill in the art having the benefit of this disclosure. In the extended position, a load may be loaded onto the trailer 100 between the vertical arms 50, 52, 54, 56. The vertical arms 50, 52, 54, 56 may be collapsed to store the trailer 100 or during transport of the trailer 100 as discussed herein. The fifth vertical arm 60 and sixth vertical arm 62 are configured to have an extended position (shown in FIG. 1) and a collapsed position (shown in FIG. 2). A bolt 69 may be used to selectively secure the fifth and sixth vertical arms 60, 62 in each of the positions. Alternatively, a pin or other member may be used to selectively secure the fifth and sixth vertical arms 60, 62 in each of the positions as would be appreciated by one of ordinary skill in the art having the benefit of this disclosure. In the extended position, the fifth and sixth vertical arms 60, 62 extend away from the bottom surface 14 of the longitudinal beam 10. Wheels 64, 66 attached to the fifth and sixth vertical arms 60, 62 enable the trailer 100 to roll across a surface. The fifth and sixth vertical arms 60, 62 may be collapsed to store the trailer 100 or during transport of the trailer 100 as discussed herein.

Figure 3:
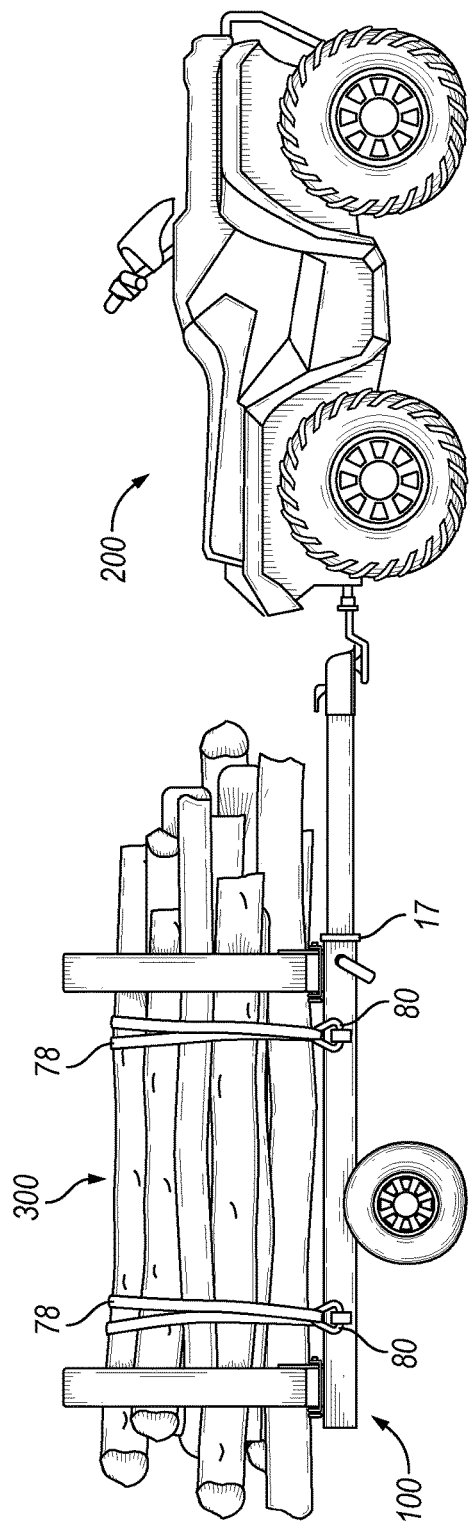
FIG. 3 is a schematic of a load of wood being hauled on an embodiment of a collapsible trailer.

FIG. 3 shows a load of firewood 300 loaded on the trailer 100. The trailer 100 may be pulled by various vehicles such as, but not limited to, an all-terrain vehicle (ATV) 200. Straps 78 may be secured to rings 80 to secure a load to the trailer.

Figure 4:
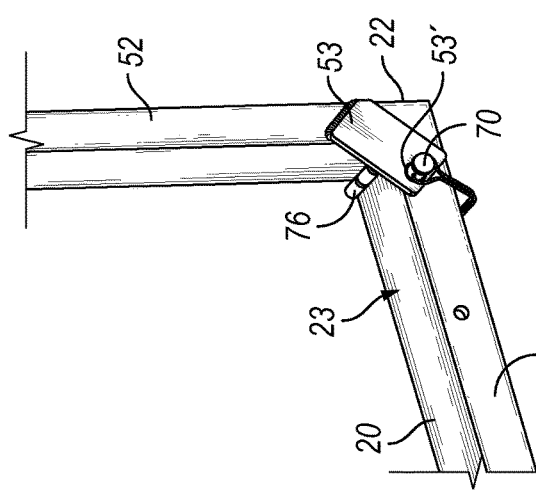
FIG. 4 shows a portion of an embodiment of a collapsible trailer.

FIG. 4 is a close-up view of the second end 22 of the first transverse beam 20 and the second vertical arm 52 in the extended position. A second angled plate 53 is connected to the second vertical arm 52. The second angled plate 53 includes an aperture 53'. A second hinge 76 connected between the second end 22 of the first transverse beam 20 and the second vertical arm 52 enables the second vertical arm 52 to pivotably move between the extended position (shown in FIG. 4) and the collapsed position. A pin 70 is inserted through the aperture 53' of the second angled plate 53 and a second inner hole (not shown) through the second end 22 of the first transverse beam 20 to selectively lock the second vertical arm 52 in the extended position.

Figure 5:
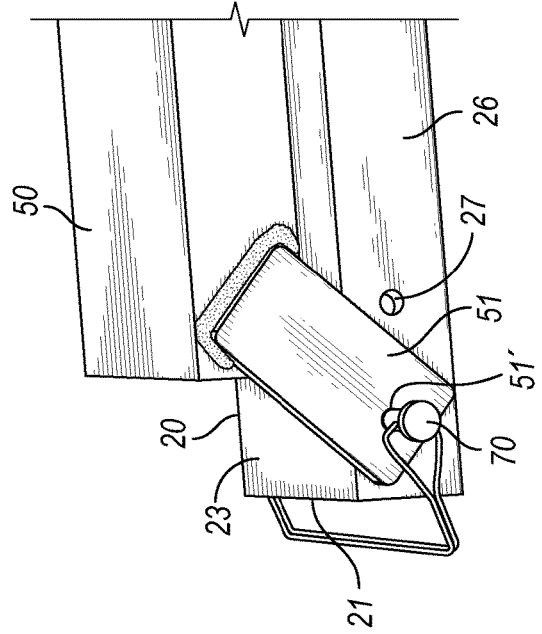
FIG. 5 shows a portion of an embodiment of a collapsible trailer.

FIG. 5 is a close-up view of the first end 21 of the first transverse beam 20 and the first vertical arm 50 in the collapsed position. A first angled plate 51 is connected to the first vertical arm 50. The first angled plate 51 includes an aperture 51'. A first hinge (not shown) is connected between the first end 21 of the first transverse beam 20 and the first vertical arm 50 that enables the first vertical arm 50 to pivotably move between the extended position and the collapsed position (shown in FIG. 5). A pin 70 is inserted through the aperture 51' of the first angled plate 51 and a first outer hole (not shown) through the first end 21 of the first transverse beam 20 to selectively lock the first vertical arm 50 in the collapsed position.

Figure 6:
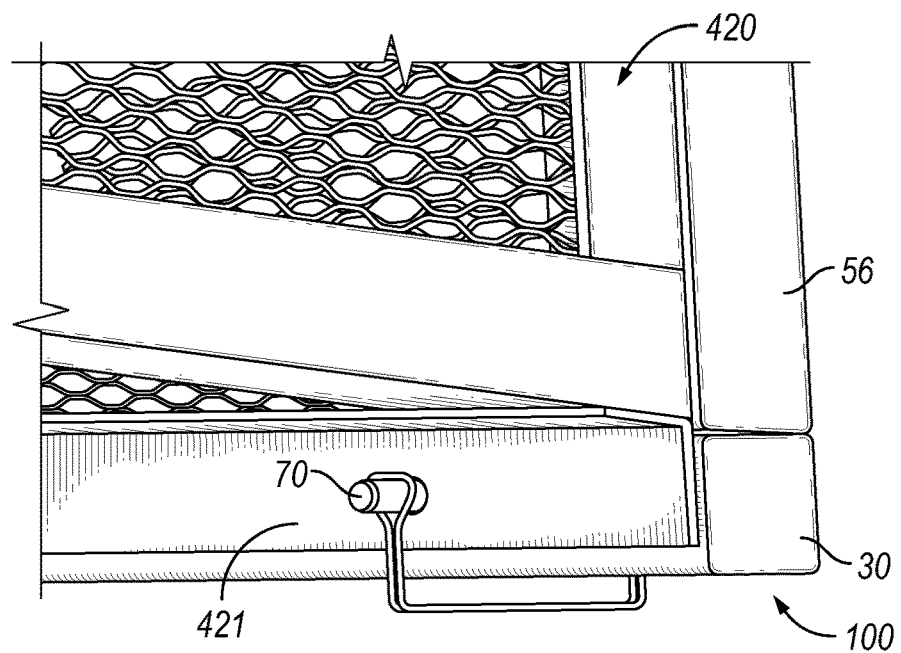
FIG. 6. shows a portion of an embodiment of a collapsible trailer.
Figure 7:
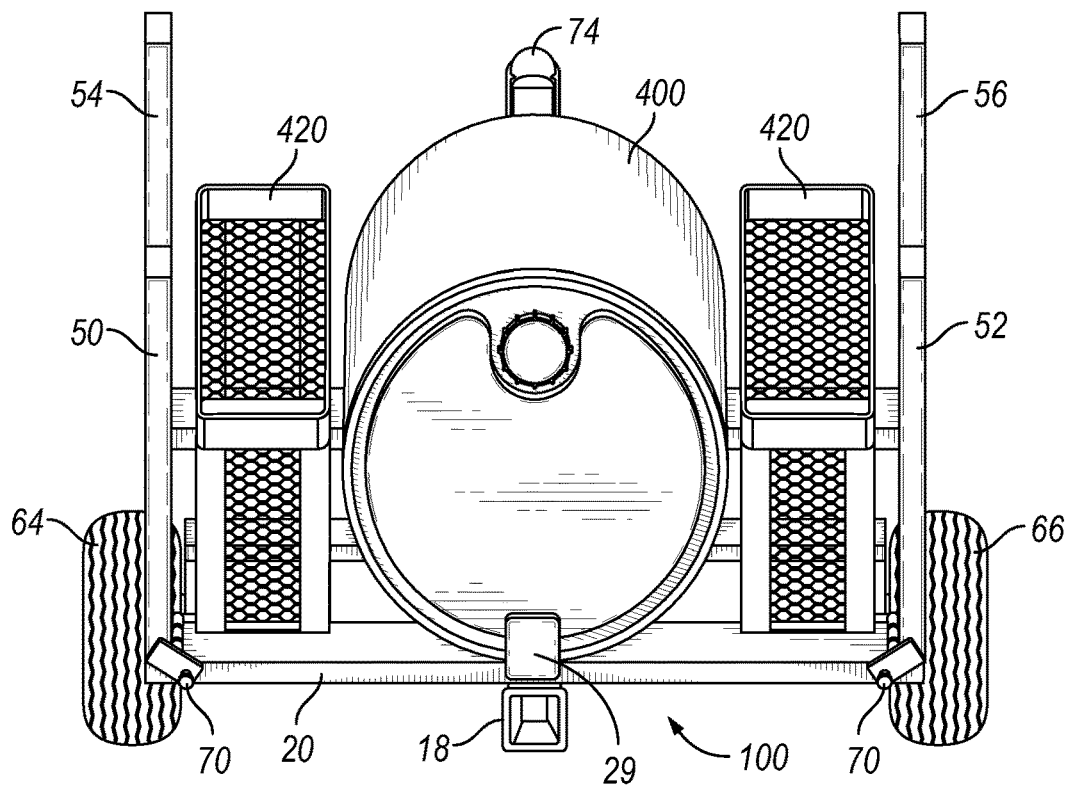
FIG. 7 shows an embodiment of a collapsible trailer

FIG. 7 shows an embodiment of the trailer 100 that includes a container or storage tank 400 and baskets 420. FIG. 6 shows a close-up view of a portion of a basket 420 connected to the trailer via a pin 70 through an angle iron 421 of the basket 420 and the second transverse beam 30 of the trailer 100. The storage tank 400 may be used to hold various material such as, but not limited to, the waste material from a RV. The trailer 100 may include a first tab 29 and a second tab (not shown). The first tab 29 may be located adjacent the left side 26 of the first transverse beam 20 and may extend above the top surface 23 of the first transverse beam 20. The second tab may be located adjacent the right side 35 of the second transverse beam 30 and may extend above the top surface 33 of the second transverse beam. The container, or storage tank, 400 may be positioned between the first and second tabs, which may help to retain the storage tank 400 on the trailer 100. The trailer 100 may include a first basket 420 connected to the first end 21 of the first transverse beam 20 and connected to the first end 31 of the second transverse beam 30. The trailer 100 may include a second basket 420 connected to the second end 22 of the first transverse beam 20 and connected to the second end 32 of the second transverse beam 30. As shown in FIG. 7, the container 400 may be positioned between the first basket and the second basket 420. The baskets 420 may be used to hold various items such as tubing and connectors. The trailer 100 may include the container 400 with one or no baskets 420 attached to the trailer 100. The rear receiver 18 may be used to connect the trailer 100 to a vehicle as would be appreciated by one of ordinary skill in the art having the benefit of this disclosure. The trailer 100 may include a first ring 80 attached to the longitudinal beam 10 and a second ring 80 attached to the longitudinal beam 100. The rings 80 may be used attachment points for straps, ropes, or the like. The first ring 80 may be positioned adjacent to the first transverse beam 20 and the second ring 80 may be positioned adjacent to the second transverse beam 30.

The trailer 100 include a third hinge 76 connected between the third vertical arm 54 and the second transverse beam 30. The trailer 100 includes a fourth hinge 76 connected between the fourth vertical arm 56 and the second transverse beam 30. As discussed herein, the hinges 76 are located between inner and outer holes through which a pin may be inserted as well as through apertures in angled plates to selectively lock the third and fourth vertical arms 54, 56 in their respective positions.

The trailer 100 includes a fifth hinge 76 connected between the fifth vertical arm 60 and the third transverse beam 40. The trailer 100 include a sixth hinge 76 connected between the sixth vertical arm 62 and the third transverse beam 40. The hinges 76 enable the fifth and sixth vertical arms 60, 62 to move between the extended and collapsed positions as discussed herein. Bolts inserted through angled plates may be threaded into nuts connected to the trailer 100 to selectively secure the fifth and sixth vertical arms 60, 62 in the extended or collapsed positions. The nuts may be connected to the third transverse beam, the fifth vertical arm, and the sixth vertical arm by various mechanisms as would be appreciated by one of ordinary skill in the art having the benefit of this disclosure. For example, the nuts may be welded in place.

Figure 8:
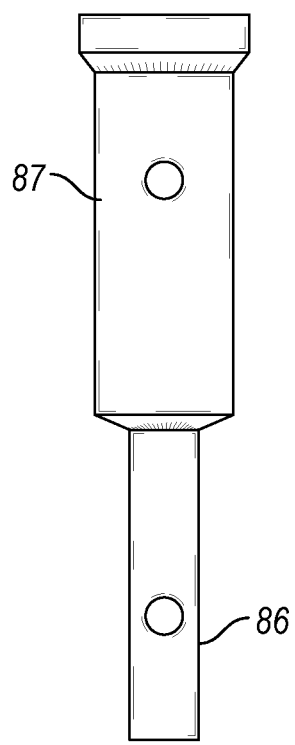
FIG. 8 shows an embodiment of a trailer hitch adapter.
Figure 9:
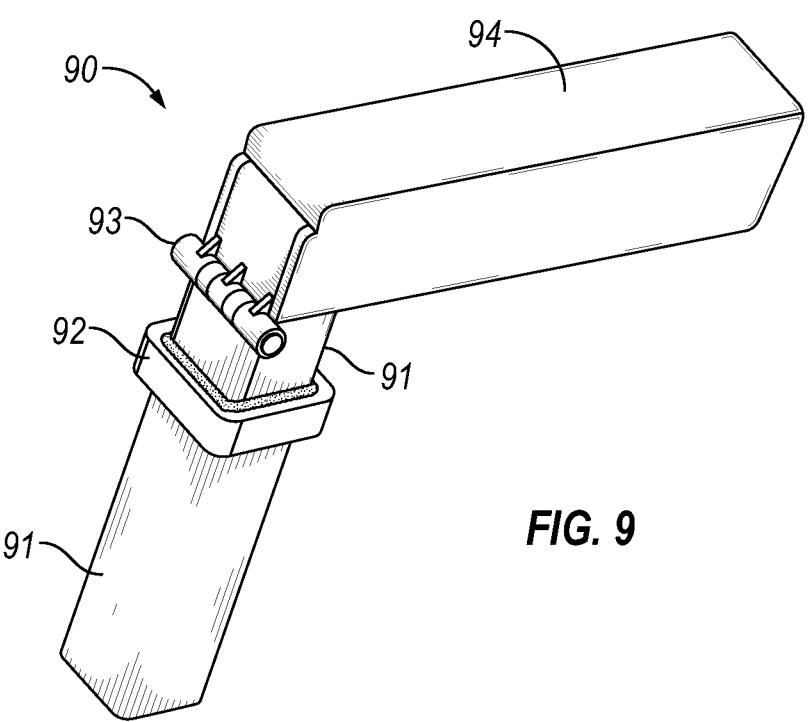
FIG. 9 shows an embodiment of a coupler.

FIG. 8 shows an embodiment of a trailer hitch adapter 85. The adapter 85 include a first larger portion 87 and a second smaller portion 86. The adapter 85 may be used to connect the trailer 100 via the first or second receiver 17, 18 to an ATV that has a smaller receiver. The second smaller portion 86 is adapted to connect to the receiver of an ATV or the like. FIG. 9 shows an embodiment of a coupler 90. The coupler 90 includes a first tongue 91, a shoulder 92, a hinge 93, and second tongue 94. The hinge 93 enables the configuration of the first and second tongues 91, 94 to form a substantially ninety (90) degree angle or move to be substantially aligned with each other as discussed herein.

Figure 10:
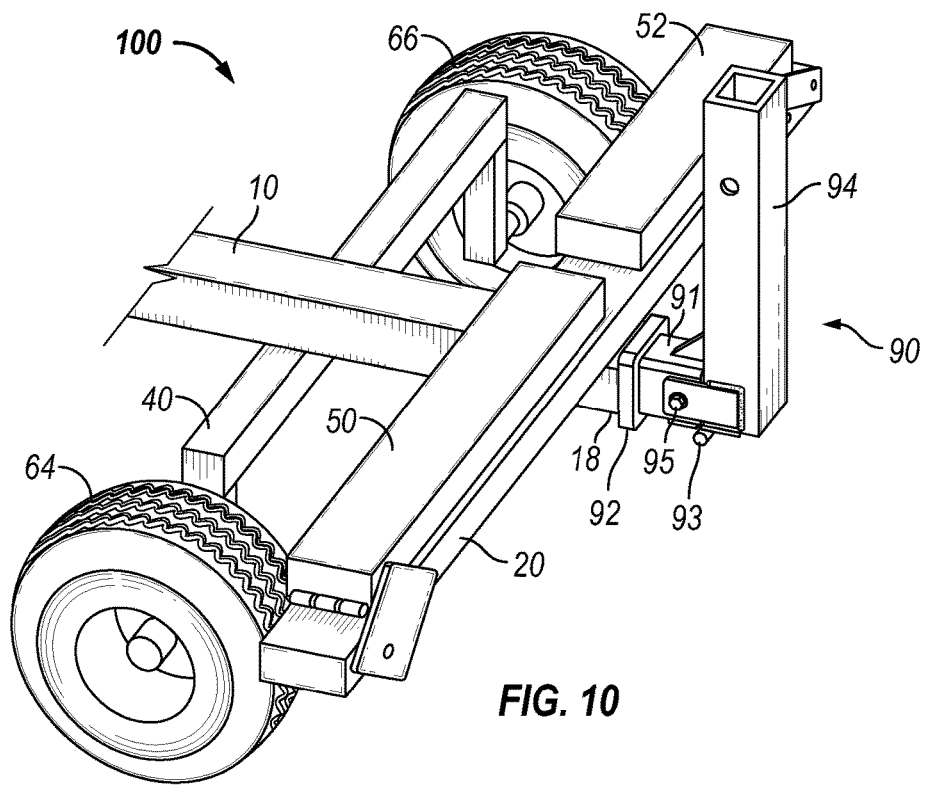
FIG. 10 shows a portion of an embodiment of a collapsible trailer.
Figure 11:
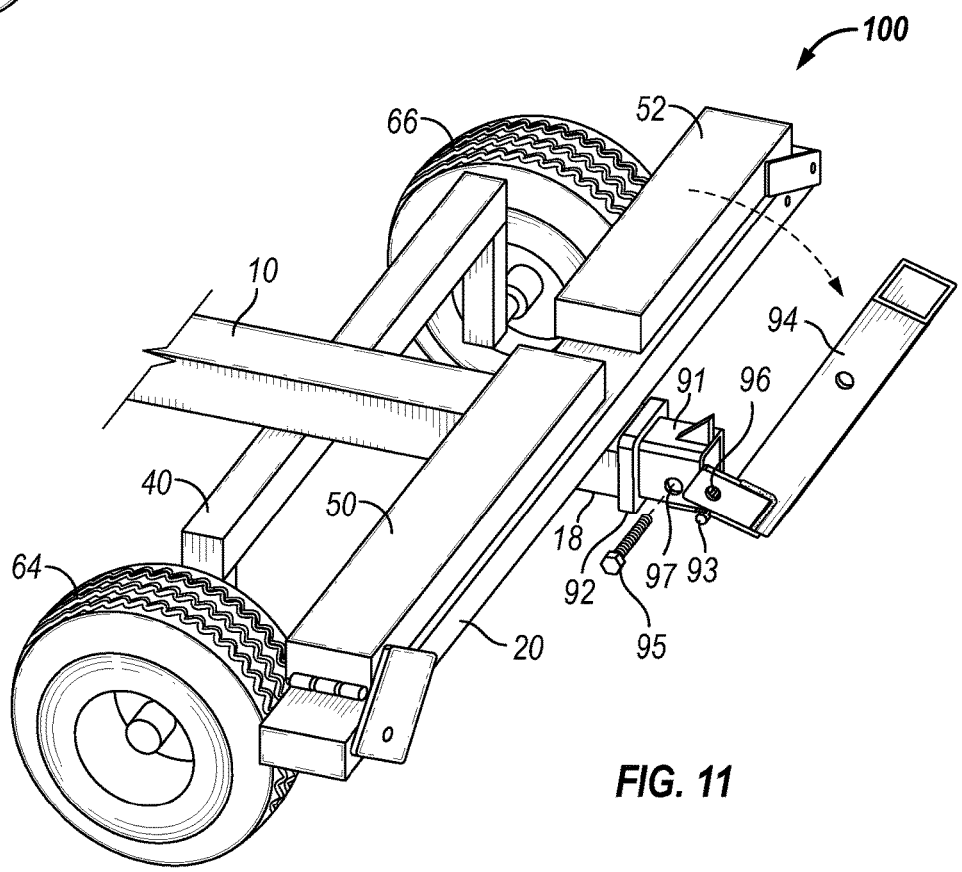
FIG. 11 shows a portion of an embodiment of a collapsible trailer.
Figure 12:
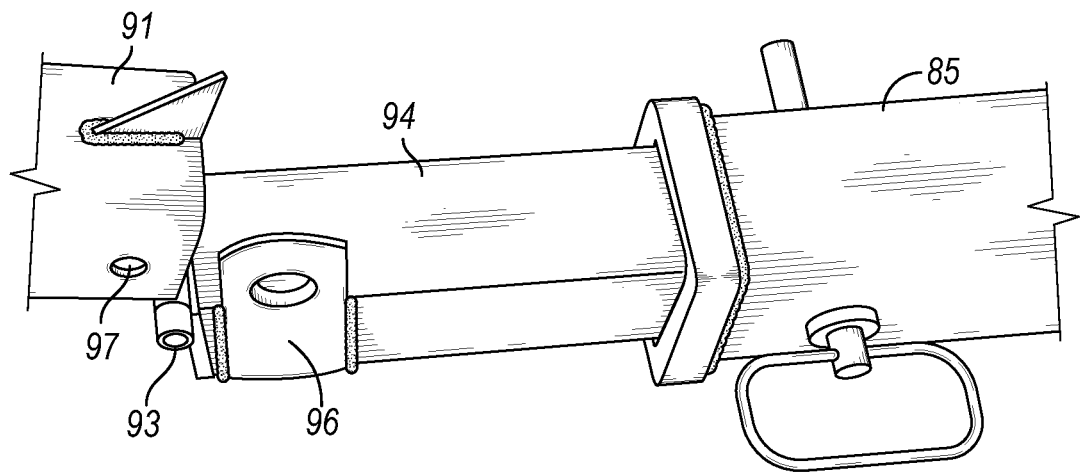
FIG. 12 shows a portion of an embodiment of a coupler connected to an embodiment of a trailer hitch adapter.
Figure 13:
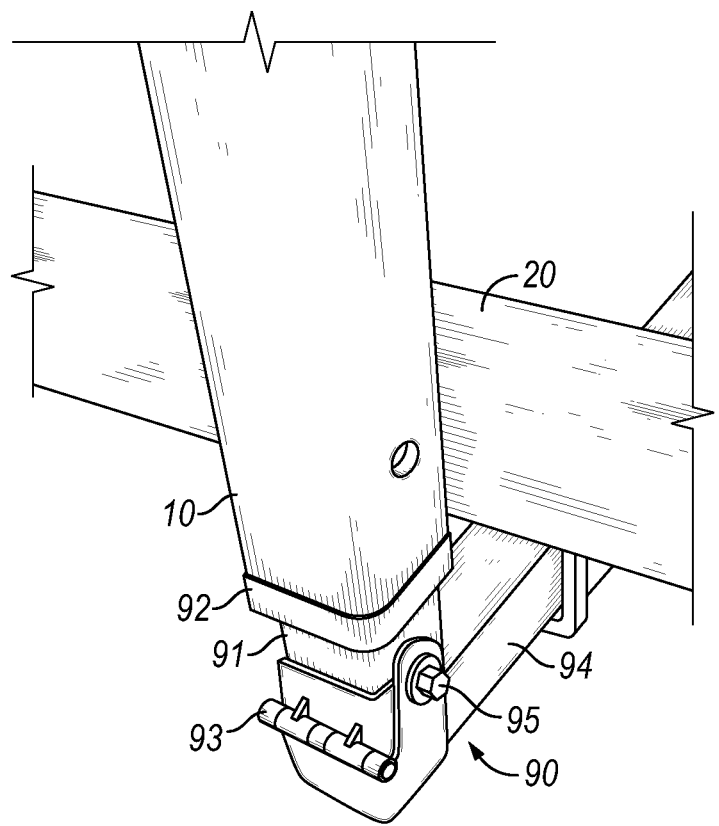
FIG. 13 shows a portion of an embodiment of a collapsible trailer.

FIG. 10 shows a portion of an embodiment of a collapsible trailer 100 with the coupler 90 connected to the rear receiver 18 of the trailer 100. The coupler 90 is selectively retained in the ninety (90) degree configuration by bolt or fastener 95 inserted through a first aperture 96 (shown in FIG. 11) and a second aperture 97 (shown in FIG. 11). FIG. 11 shows the bolt 95 removed enabling the second tongue 94 to pivot away from the rear receiver 18 of the trailer 100. The second tongue 94 may be pivot approximately ninety (90) degrees to enable insertion of the second tongue into a receiver, such as the trailer hitch adapter 85 as shown in FIG. 12. After the second tongue 94 is secured into the trailer hitch adapter 85, the trailer 100 connected to the coupler 90 may be rotated so that the first tongue 91 and second tongue 94 are once again at a ninety (90) degree configuration as shown in FIG. 13. This enables that trailer 100 to be transported in by an ATV or the like without being towed along the ground.

Figure 14:
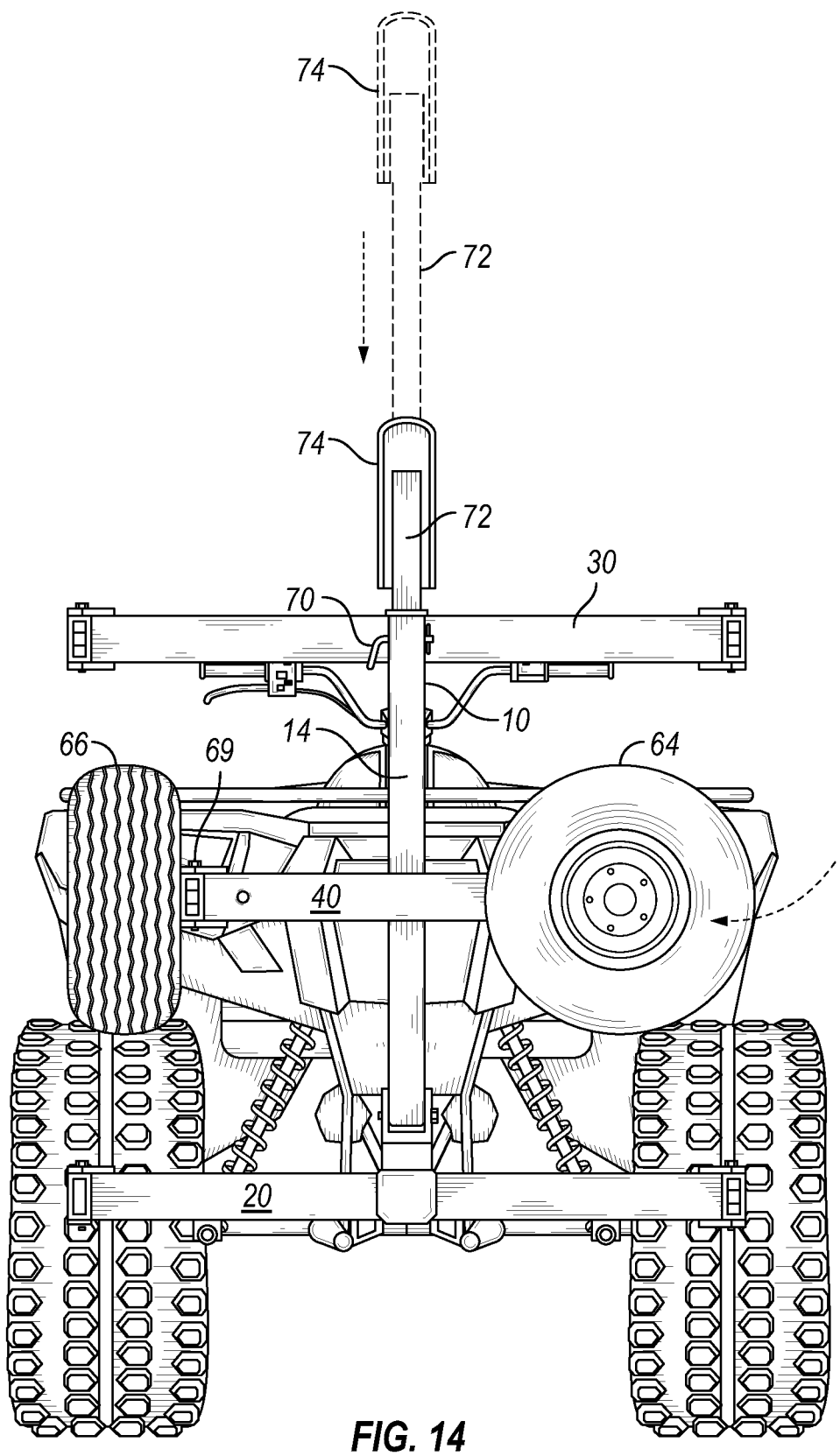
FIG. 14 shows an embodiment of a collapsible trailer connected to an all-terrain vehicle.

FIG. 14 shows a collapsible trailer 100 connected to an all-terrain vehicle. As indicated by the dashed lines, the portion of the tongue 74 may be inserted into the longitudinal beam 10 of the trailer 100 to reduce the height of the ball coupler 74 with respect to the ground. FIG. 14 shows the fifth vertical arm 60 connected to the first wheel 74 in the collapsed position with the sixth vertical arm 62 connected to the second wheel 66 in the extended position. Both the fifth and sixth vertical arms 60, 62 may be moved to the collapsed position to move the wheels 64, 66 inward to the trailer 100.

Figure 15:
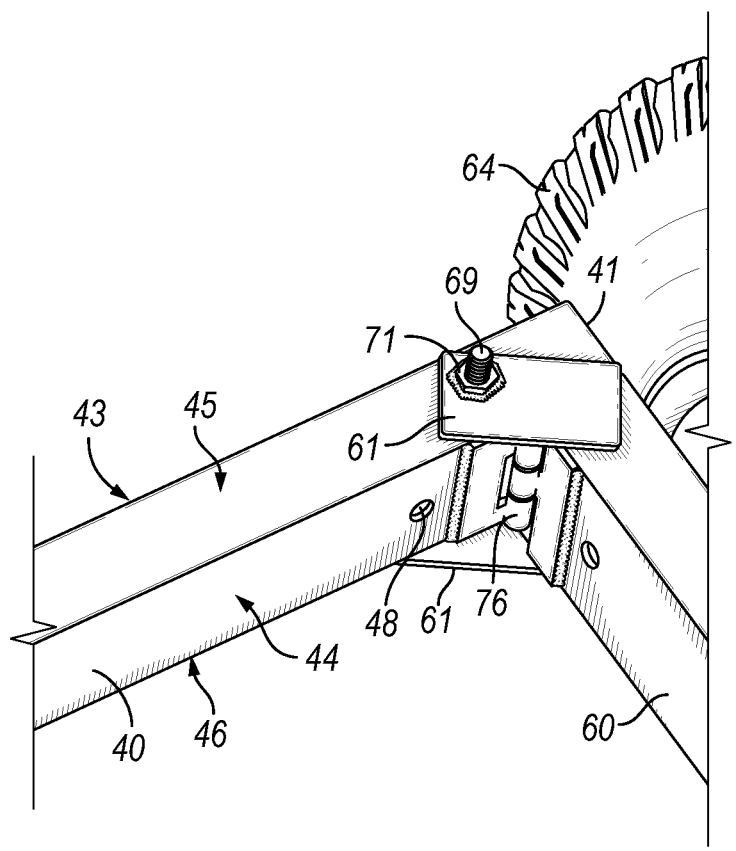
FIG. 15 shows a portion of an embodiment of a collapsible trailer.

FIG. 15 is a close-up view of the first end 41 of the third transverse beam 40 and the fifth vertical arm 60 in the extended position. Angled plates 61 are connected to the fifth vertical arm 60. The angled plates include apertures through which a bolt 69 is inserted to selectively secure the fifth vertical arm 60 in the extended position. A hinge 76 connected between the first end 41 of the third transverse beam 40 and the fifth vertical arm 60 enables the fifth vertical arm 60 to pivotably move between the extended position (shown in FIG. 15) and the collapsed position. The bolt 69 passes through hole 47 in the left and right sides of the third transverse beam and is threaded into a nut 71 to secure the vertical arm in place. As shown in FIG. 15, the fifth vertical arm 60 extends away from the bottom surface 44 of the third transverse beam 40.

Figure 16:
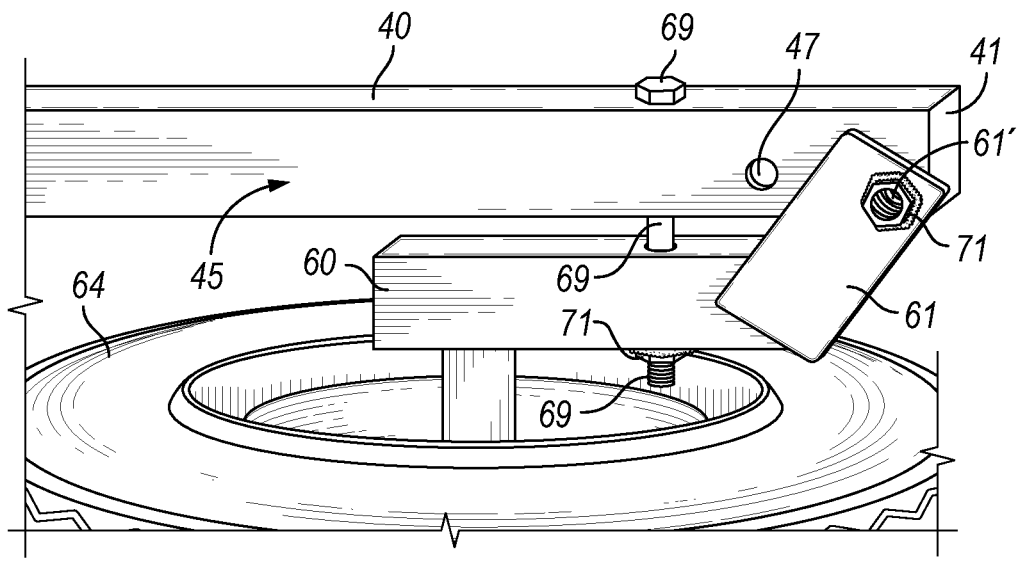
FIG. 16 shows a portion of an embodiment of a collapsible trailer.

FIG. 16 is a close-up view of the first end 41 of the third transverse beam 40 and the fifth vertical arm 60 in the collapsed position. A bolt 69 is inserted through the top surface 43 and bottom surface 44 of the third transverse beam 40 to selectively secure the fifth vertical arm 60 in the collapsed position. The bolt 69 is threaded into a nut 71 to secure the vertical arm in place. As shown in FIG. 16, the fifth vertical arm 60 is substantially parallel with the bottom surface 44 of the third transverse beam 40 when in the collapsed position.

Figure 17:
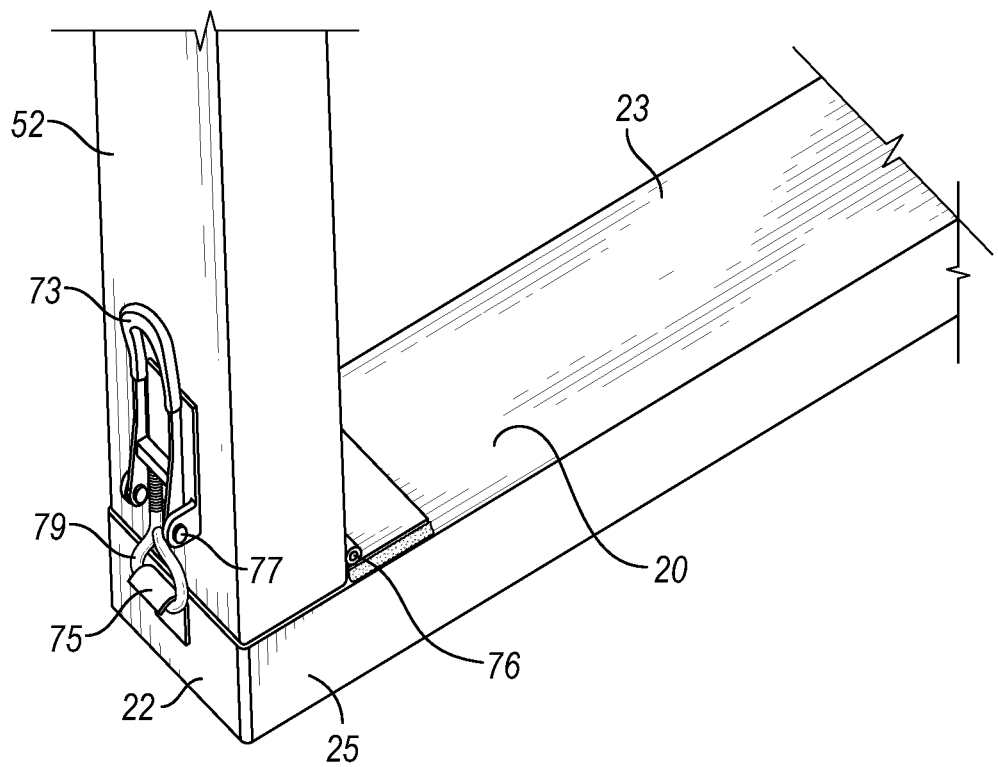
FIG. 17 shows a portion of an embodiment of a collapsible trailer.

FIG. 17 is a close-up view of the second end 22 of the first transverse beam 20 and the second vertical arm 52 in the extended position. The second vertical arm 52 extends away from the top surface 23 of the first transverse beam. A hinge 76 connected between the second end 22 of the first transverse beam 20 and the second vertical arm 52 enables the second vertical arm 52 to pivotably move between the extended position and the collapsed position. A latch 73 connected to the second vertical arm 52 may be used to secure the second vertical arm 52 in the extended position. The latch 73 is pivotable about pin 77 to move a hook 79 to engage a tab 75 on the second end 22 of the first transverse beam 20. With the hook 79 engaged with the tab 75, the second vertical arm 52 is secured in the extended position. The hook 79 may be threaded into a portion of the latch 73, which enables the length that the hook 79 extends away from the latch 73 to be lengthened or shortened.

Figure 18:
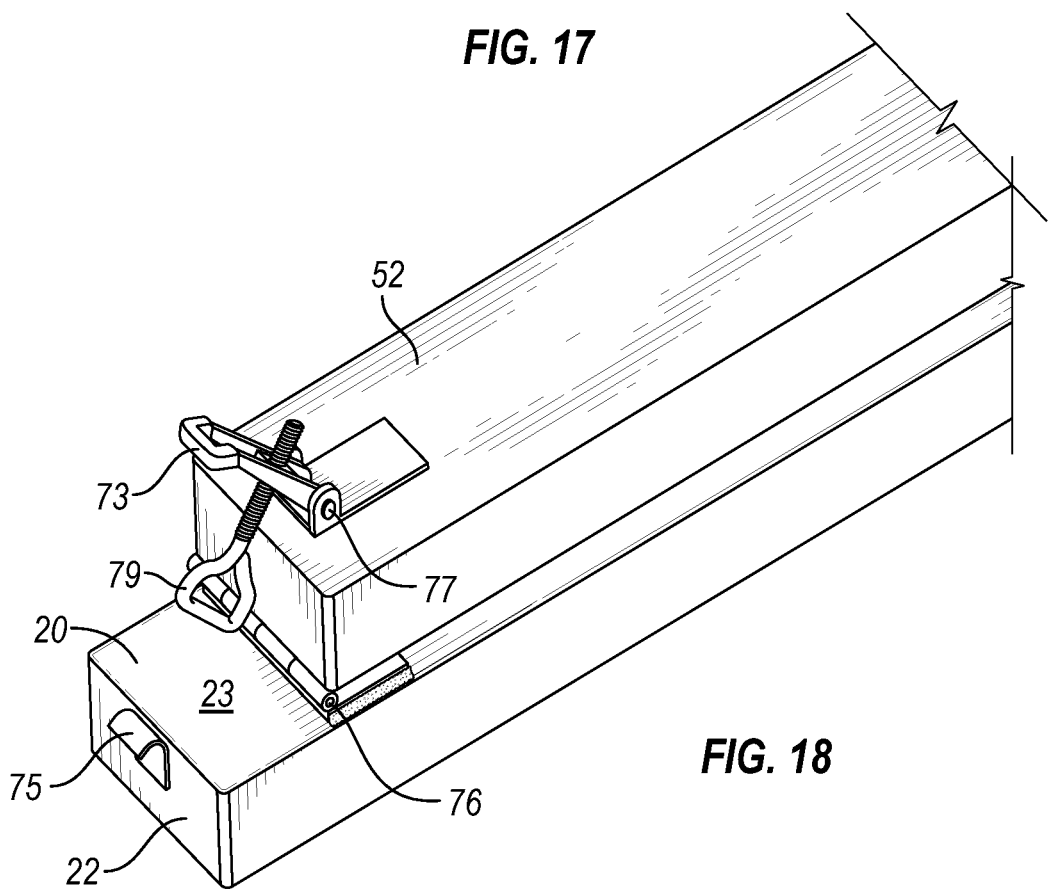
FIG. 18 shows a portion of an embodiment of a collapsible trailer.

FIG. 18 is a close-up view of the second end 22 of the first transverse beam 20 and the second vertical arm 52 in the collapsed position. The latch 73 connected to the second vertical arm 52 has been pivoted to move the hook 79 away from the tab 75 enabling the second vertical arm 52 to be moved from the extended position to the collapsed position.

Although various examples have been shown and described, the present disclosure is not so limited and will be understood to include all such modifications and variations as would be apparent to one skilled in the art.

What is claimed is:
1. A trailer comprising:
a longitudinal beam having a first end and a second end opposite of the first end, a top surface and a bottom surface opposite of the top surface, a left surface, and a right surface opposite of the left surface;
a first transverse beam having a first end, a second end, a top surface, a bottom surface, a left side, and a right side, the first transverse beam is located at the second end of the longitudinal beam, the first transverse beam is connected to the longitudinal beam and is positioned transverse to the longitudinal beam;
a first vertical arm pivotally connected to the first end of the first transverse beam, wherein the first vertical arm is movable between an extended position in which the first vertical arm is perpendicular to the first transverse beam and a collapsed position in which the first vertical arm is parallel to the first transverse beam and wherein in the extended position the first vertical arm extends away from the top surface of the first transverse beam;
a second vertical arm pivotally connected to the second end of the first transverse beam, wherein the second vertical arm is movable between an extended position in which the second vertical arm is perpendicular to the first transverse beam and a collapsed position in which the second vertical arm is parallel to the first transverse beam and wherein in the extended position the second vertical arm extends away from the top surface of the first transverse beam;
a second transverse beam having a first end, a second end, a top surface, a bottom surface, a left side, and a right side, the second transverse beam is connected to the longitudinal beam and is positioned transverse to the longitudinal beam;
a third vertical arm pivotally connected to the first end of the second transverse beam, wherein the third vertical arm is movable between an extended position in which the third vertical arm is perpendicular to the second transverse beam and a collapsed position in which the third vertical arm is parallel to the second transverse beam and wherein in the extended position the third vertical arm extends away from the top surface of the second transverse beam;
a fourth vertical arm pivotally connected to the second end of the second transverse beam, wherein the fourth vertical arm is movable between an extended position in which the fourth vertical arm is perpendicular to the second transverse beam and a collapsed position in which the fourth vertical arm is parallel to the second transverse beam and wherein in the extended position the fourth vertical arm extends away from the top surface of the second transverse beam;

a third transverse beam having a first end, a second end, a top surface, a bottom surface, a left side, and a right side, the third transverse beam is positioned between the first transverse beam and the second transverse beam, the third transverse beam is connected the longitudinal beam and is positioned transverse to the longitudinal beam;

a fifth vertical arm pivotally connected to the first end of the third transverse beam, wherein the fifth vertical arm is movable between an extended position in which the fifth vertical arm is perpendicular to the third transverse beam and a collapsed position in which the fifth vertical arm is parallel to the third transverse beam and wherein in the extended position the third vertical arm extends away from the bottom surface of the third transverse beam;

a sixth vertical arm pivotally connected to the second end of the third transverse beam, wherein the sixth vertical arm is movable between an extended position in which the sixth vertical arm is perpendicular to the third transverse beam and a collapsed position in which the sixth vertical arm is parallel to the third transverse beam and wherein in the extended position the sixth vertical arm extends away from the bottom surface of the third transverse beam;

a first wheel connected to the fifth vertical arm; and a second wheel connected to the sixth vertical arm.

2. The trailer of claim 1, wherein the first transverse beam is connected to the top surface of the longitudinal beam, wherein the second transverse beam is connected to the top surface of the longitudinal beam, and wherein the third transverse beam is connected to the bottom surface of the longitudinal beam.

3. The trailer of claim 2, further comprising a first hinge connected between the first vertical arm and the first transverse beam and a second hinge connected between the second vertical arm and the first transverse beam.

4. The trailer of claim 3, further comprising:
a tab connected to the first end of the first transverse beam;
a latch connected to the first vertical arm, the latch being pivotable with respect to the first vertical arm; and
a hook connected to the latch, wherein the first vertical arm may be selectively secured in the extended position when the hook engages the tab and wherein the latch may be selectively pivoted to move the hook out of engagement with the tab to enable the first vertical arm to move from the extended position to the collapsed position.

5. The trailer of claim 3, further comprising a first inner hole through the left and right sides of the first transverse beam and a first outer hole through the left and right sides of the first transverse beam wherein the first hinge is positioned between the first outer hole and the first inner hole and comprising a second inner hole through the left and right sides of the first transverse beam and a second outer hole through the left and right sides of the first transverse beam wherein the second hinge is positioned between the second outer hole and the second inner hole.

6. The trailer of claim 5, further comprising a first angled plate connected to the first vertical arm, the first angled plate including a first aperture, wherein the first aperture is aligned with the first inner hole when the first vertical arm is in the extended position and wherein the first aperture is aligned with the first outer hole when the first vertical arm is in the collapsed position and further comprising a second angled plate connected to the second vertical arm, the second angled plate including a second aperture, wherein the second aperture is aligned with the second inner hole when the second vertical arm is in the extended position and wherein the second aperture is aligned with the second outer hole when the second vertical arm is in the collapsed position.

7. The trailer of claim 6, further comprising a first pin and a second pin, wherein the first pin locks the first vertical arm in the extended position when inserted through the first aperture and the first inner hole, wherein the first pin locks the first vertical arm in the collapsed positioned when inserted through the first aperture and the first outer hole, wherein the second pin locks the second vertical arm in the extended position when inserted through the second aperture and the second inner hole, wherein the second pin locks the second vertical arm in the collapsed positioned when inserted through the second aperture and the second outer hole.

8. The trailer of claim 7, further comprising a first tab and a second tab, wherein the first tab is located adjacent the left side of the first transverse beam and extends above the top surface of the first transverse beam and wherein the second tab is located adjacent the right side of the second transverse beam and extends above the top surface of the second transverse beam.

9. The trailer of claim 8, further comprising a container positioned between the first tab and the second tab.

10. The trailer of claim 9, further comprising a first basket connected to the first end of the first transverse beam and connected to the first end of the second transverse beam and further comprising a second basket connected to the second end of the first transverse beam and connected to the second end of the second transverse beam, wherein the container is positioned between the first basket and the second basket.

11. The trailer of claim 10, further comprising a first ring attached to the longitudinal beam and a second ring attached to the longitudinal beam, wherein the first ring is positioned adjacent to the first transverse beam and wherein the second ring is positioned adjacent to the second transverse beam.

12. The trailer of claim 7, further comprising:
a third hinge connected between the third vertical arm and the second transverse beam;
a fourth hinge connected between the fourth vertical arm and the second transverse beam;
a third inner hole through the left and right sides of the second transverse beam;
a third outer hole through the left and right sides of the second transverse beam, wherein the third hinge is positioned between the third outer hole and the third inner hole;
a fourth inner hole through the left and right sides of the second transverse beam and a fourth outer hole through the left and right sides of the second transverse beam, wherein the fourth hinge is positioned between the fourth outer hole and the fourth inner hole;
a third angled plate connected to the third vertical arm, the third angled plate including a third aperture, wherein the third aperture is aligned with the third inner hole when the third vertical arm is in the extended position and wherein the third aperture is aligned with the third outer hole when the third vertical arm is in the collapsed position;
a fourth angled plate connected to the fourth vertical arm, the fourth angled plate including a fourth aperture, wherein the fourth aperture is aligned with the fourth inner hole when the fourth vertical arm is in the extended position and wherein the fourth aperture is aligned with the fourth outer hole when the fourth vertical arm is in the collapsed position;
a third pin, wherein the third pin locks the third vertical arm in the extended position when inserted through the third aperture and the third inner hole and wherein the third pin locks the third vertical arm in the collapsed positioned when inserted through the third aperture and the third outer hole; and
a fourth pin, wherein the fourth pin locks the fourth vertical arm in the extended position when inserted through the fourth aperture and the fourth inner hole and wherein the fourth pin locks the fourth vertical arm in the collapsed positioned when inserted through the fourth aperture and the fourth outer hole.

13. The trailer of claim 12, further comprising:
a fifth hinge connected between the fifth vertical arm and the third transverse beam;
a sixth hinge connected between the sixth vertical arm and the third transverse beam;
a fifth hole through the left and right sides of the third transverse beam;
a sixth hole through the left and right sides of the third transverse beam;
a seventh hole through the top and bottom of the third transverse beam;
an eighth hole through the top and bottom of the third transverse beam;
a fifth angled plate connected to the fifth vertical arm, the fifth angled plate including a fifth aperture;
a sixth angled plate connected to the fifth vertical arm, the sixth angled plate including a sixth aperture, wherein both the fifth and sixth apertures are aligned with the fifth hole when the fifth vertical arm is in the extended position;
a seventh angled plate connected to the sixth vertical arm, the seventh angled plate including a seventh aperture;
an eighth angled plate connected to the sixth vertical arm, the eighth angled plate including an eighth aperture, wherein both the fifth and sixth apertures are aligned with the sixth hole when the sixth vertical arm is in the extended position;
a first bolt;
a second bolt;
a first nut connected to the fifth angled plate, an opening of the first nut being aligned with the fifth aperture;
a second nut connected to the sixth angled plate, an opening of the second nut being aligned with the sixth aperture;
a third nut connected to the fifth vertical arm, an opening of the third nut being aligned with an opening in the fifth vertical arm;
a fourth nut connected to the sixth vertical arm, an opening of the fourth nut being aligned with an opening in the sixth vertical arm;
wherein the first bolt positioned through the fifth hole, the fifth aperture, the sixth aperture, and the first nut secures the fifth vertical arm in the extended position;
wherein the first bolt positioned through the seventh hole and the third nut secures the fifth vertical arm in the collapsed positioned;
wherein the second bolt positioned through the sixth hole, the seventh aperture, the eighth aperture, and the second nut secures the sixth vertical arm in the extended position; and
wherein the second bolt positioned through the eighth hole and the fourth nut secures the sixth vertical arm in the collapsed position.

14. The trailer of claim 13, wherein the first nut is welded to the fifth angled plate and the second nut is welded to the sixth angled plate, wherein the third nut is welded to the fifth vertical arm, and wherein the fourth nut is welded to the sixth vertical arm.

15. The trailer of claim 1, further comprising a first receiver at the first end of the longitudinal beam and a second receiver at the second end of the longitudinal beam.

16. The trailer of claim 15, further comprising a hitch connected to the first receiver and a coupler connected to the second receiver, the coupler comprising a first portion connected to a second portion, wherein the first and second portions are pivotable with respect to each other between 90 degrees and substantially zero degrees.

17. A trailer comprising:
a longitudinal beam;
a first transverse beam connected to the longitudinal beam and positioned transverse to the longitudinal beam;
first vertical arm pivotally connected to a first end of the first transverse beam;
a second vertical arm pivotally connected to a second end of the first transverse beam;
a second transverse beam connected to the longitudinal beam and positioned transverse to the longitudinal beam;
a third vertical arm pivotally connected to a first end of the second transverse beam;
a fourth vertical arm pivotally connected to a second end of the second transverse beam;
a third transverse beam connected to the longitudinal beam and positioned transverse to the longitudinal beam, the third transverse beam positioned between the first transverse beam and the second transverse beam;
a fifth vertical arm pivotally connected to a first end of the third transverse beam;
a sixth vertical arm pivotally connected to a second end of the third transverse beam;
a first wheel connected to the fifth vertical arm;
a second wheel connected to the sixth vertical arm; and
a coupler connected to an end of the longitudinal beam, the coupler comprising a first portion connected to a second portion, wherein the first and second portions are pivotable with respect to each other between 90 degrees and substantially zero degrees.

18. The trailer of claim 17, wherein the fifth vertical arm and the sixth vertical arm may both be pivoted between a position perpendicular with the third transverse beam and a positioned parallel with the third transverse beam.

19. A trailer comprising:
a longitudinal beam;
a first transverse beam connected to the longitudinal beam and positioned transverse to the longitudinal beam;
a first vertical arm pivotally connected to a first end of the first transverse beam;
a second vertical arm pivotally connected to a second end of the first transverse beam;
a second transverse beam connected to the longitudinal beam and positioned transverse to the longitudinal beam;
a third vertical arm pivotally connected to a first end of the second transverse beam;
a fourth vertical arm pivotally connected to a second end of the second transverse beam;

a third transverse beam connected to the longitudinal beam and positioned transverse to the longitudinal beam, the third transverse beam positioned between the first transverse beam and the second transverse beam;

a fifth vertical arm pivotally connected to a first end of the third transverse beam;

a sixth vertical arm pivotally connected to a second end of the third transverse beam;

a first wheel connected to the fifth vertical arm;

a second wheel connected to the sixth vertical arm;

a hitch connected to a first end of the longitudinal beam, wherein the hitch comprises a ball coupler connected to a tongue, wherein the tongue is configured to telescope within the longitudinal beam.

20. The trailer of claim 19, wherein the tongue has a length that is at least one fourth of a length of the longitudinal beam.

21. The trailer of claim 19, further comprising a coupler connected to a second end of the longitudinal beam, the coupler comprising a first portion connected to a second portion, wherein the first and second portions are pivotable with respect to each other between 90 degrees and substantially zero degrees.

\* \* \* \* \*